May 21, 1963 W. C. YOCUM 3,090,490
FILTER-DRIER COMBINATION
Filed Oct. 31, 1960

INVENTOR.
William C. Yocum
BY Webb, Mackey & Burden
HIS ATTORNEYS

3,090,490
FILTER-DRIER COMBINATION
William C. Yocum, Mount Lebanon, Pa., assignor to Superior Valve & Fittings Co., Pittsburgh, Pa., a corporation of Pennsylvania
Filed Oct. 31, 1960, Ser. No. 66,193
4 Claims. (Cl. 210—299)

This invention relates to a filter-drier combination for connection into lines, conduits or piping which convey and transmit fluids such as gases and liquids which have a moisture and/or a foreign particle content. Some of the fluids for which the combination is particularly designed function as refrigerants in air conditioners, freezers, refrigerators, etc.

Refrigeration units or systems, such as a row of refrigerated display cases, are built up or assembled at their site of installation with tubing, valves, etc. combined to connect the cases to one or more central refrigeration compressors. Such units require a drier in the tubing or conduits which convey the refrigerant because moisture, including that carried by the atmosphere, gets into the tubing and valves during installation and creates serious problems.

Also, manufacturers of complete self-contained refrigeration assemblies include driers in most of their designs to avoid and overcome problems arising from moisture in the refrigerant.

A moisture content in a refrigeration system from over about 15 to about 60 parts and more per million parts of refrigerant fluid is excessive and must be removed. That point at which the moisture content in the refrigerant fluid is excessive is dependent upon the type of refrigerant used for some have a greater ability for retaining moisture than others. Presence of excessive moisture in the refrigerant creates a problem of freezing at such critical locations as expansion valves and capillary tubes, thus causing improper operation of the system. In light of this freezing problem, it is advantageous to effect removal of moisture as soon as possible after a system or unit has been placed in operation and to provide a path of flow of the refrigerant through a desiccant such that there is substantial absorption or adsorption of moisture by a maximum amount of the desiccant.

In addition to removal of moisture from the fluids, it is also important to filter out foreign matter or particles such as dirt, chips, solder droplets, etc. to avoid wear of components of the system and contamination of the desiccant. Some refrigerants, after having been charged into a refrigeration system, are heavily ladened with foreign particles and are so dirty that they clog up filters, thus rendering the system inoperative. Accordingly, it is desirable to have a filter with a high capacity for removing large amounts of foreign particles from the refrigerant.

My invention provides a filter-drier combination which has ability to rapidly remove moisture from fluids by subjecting a maximum amount of the desiccant material to the fluid flow and which also has ability to efficiently filter out large amounts of foreign matter carried by the fluid. Specifically, my combination comprises a housing wherein fluid enters through an inlet, flows therethrough and exits through an outlet. Disposed within the housing substantially transversely of the longitudinal axis of the housing and transversely of the flow of fluid therethrough is a hemispherical shaped screen with its nose pointed towards the inlet. The hemispherical screen extends radially from the longitudinal axis to and into engagement with an inside wall of the housing. Located on the outlet side of the hemispherical screen is a filter layer of fibers also disposed substantially transversely of the longitudinal axis of the housing and transversely of the flow of fluid. The filter layer extends radially to and into engagement with the inside wall of the housing and has a cylindrical part which runs along the inside wall of the housing towards the outlet.

A spring, such as a circular band of spring steel, engages a first portion of the cylindrical part of the filter layer spaced apart from the periphery of the hemispherical screen and urges and maintains the first portion in contact with and completely around the inside wall of the housing. This spring acts radially upon the first portion of the cylindrical part and assures that the fluid flow through the housing must traverse the filter layer.

A second portion of the cylindrical part, that not engaged by the spring means, and a part of the inside wall of the housing form a well for collection of filtered foreign particles.

On the outlet side of the filter layer is a substantially flat member such as a screen pervious to passage of gas or liquid therethrough. This flat member is opposite the outlet and transversely of the longitudinal axis of the housing. It extends to and engages the inside wall of the housing and together with the filter layer and a peripheral part of the hemispherical screen forms a chamber which is filled by a desiccant material.

Preferably, the filter layer abuts and engages the outlet side of the hemispherical screen and thus has a hemispherical shape itself with its nose pointed towards the inlet. Accordingly, the chamber also has a hemispherical shape and when filled with a desiccant material, the desiccant material, too, has a hemispherical shape with its nose directed towards the inlet.

In the accompanying drawings I have shown a preferred embodiment of my invention in which.

Figure 1:
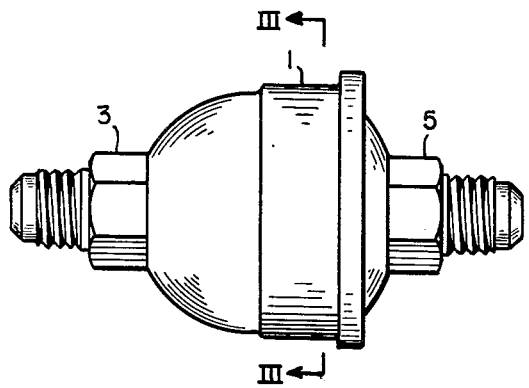
FIGURE 1 is a side elevation view of my filter-drier combination.
Figure 2:
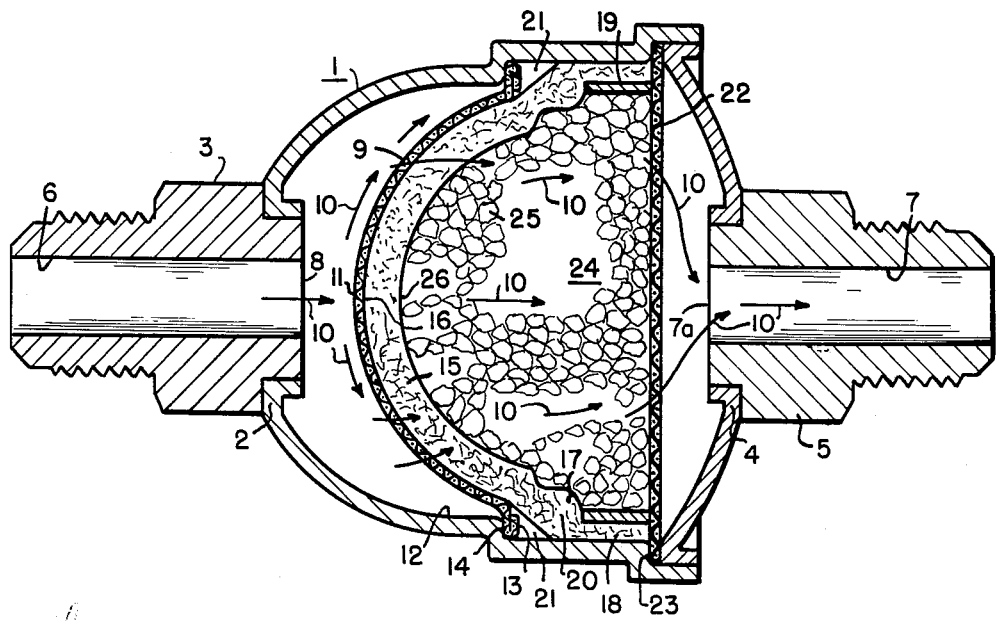
FIGURE 2 is an enlarged longitudinal section view of the combination of FIGURE 1.
Figure 3:
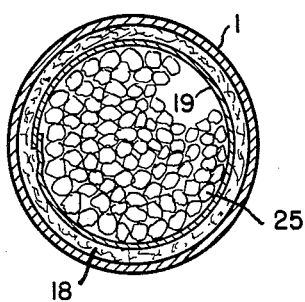
FIGURE 3 is a section view along the line III—III of FIGURE 1.

Referring to FIGURES 1–3, my combination comprises a housing or casing 1 somewhat hemispherical in shape with one end 2 receiving a first nipple 3 and with another end 4 receiving a second nipple 5. Extending longitudinally through the nipple 3 is an axial bore 6 through which fluid enters the housing or the casing and which forms an inlet therefor. The second nipple 5 also has an axial bore 7 extending therethrough to form an an outlet for the housing through which fluid exits therefrom.

Inside the housing, opposite to and spaced apart from an opening 8 of the bore 6 into the housing is a hemispherical shaped screen 9 disposed transversely of the longitudinal axis of the housing and transversely of fluid flow therethrough represented by arrows 10 with its nose 11 pointed towards the opening 8. The hemispherical screen extends radially to and into engagement with the inside wall 12 of the housing where it is supported by a circular frame 13. The frame sits upon a first peripheral shoulder 14 which forms a part of the inside wall of the housing.

On the outlet side of the hemispherical screen is a circular filter layer 15 for removing foreign particles from the fluid flowing through the housing. The layer is made from fibers such as wool, asbestos, ceramics including glass, sodium-calcium silicates, calcium aluminates, aluminum silicates, calcium silicates and sodium silicates. The layer which is flexible and pliable abuts and engages the hemispherical screen so that it has a hemispherical shape itself. Accordingly, its nose 16 is directed towards the opening 8. Like the hemispherical screen, the layer is transversely of the longitudinal axis of the housing and transversely of the flow of fluid and extends radially to and into engagement with the inside wall 12 thereof.

The layer has a cylindrical part 17 which runs along the inside wall 12 of the housing towards the outlet 7 and which extends completely around the inside wall of the housing.

A first portion 18 of the length of the cylindrical part 17, i.e., that nearer the outlet 7, is held in engagement with the inside wall and completely therearound by a circular band spring 19. As shown in FIGURE 2, a second portion 20 of the cylindrical part, i.e., that closest to the frame 13, forms with the inside wall 12 and the frame 13, a well 21 which will be more fully discussed hereinafter. The band spring acts radially upon the first portion 18 of the cylindrical part 17 and thereby insures that all of the first portion of the part is urged into engagement with the inside wall so that all fluid flowing through the housing must traverse the filter layer 15.

Opposite the inside end 7a of the outlet 7 and spaced apart therefrom is a flat screen 22 disposed transversely of the longitudinal axis of the housing and extending radially to and into engagement with the inside wall. This flat screen rests upon a second peripheral shoulder 23 located flush with the end of the cylindrical part 17 and forming a part of the inside wall 12.

Both the hemispherical shaped screen and the flat screen have filter abilities but the filter layer performs a major part of filtration of the fluids flowing through my combination.

The flat screen 22, filter layer 15 and band spring 19 form a hemispherical shaped chamber 24 which is filled with a body of desiccant material 25 so that the body of desiccant material has also a hemispherical shape with its nose 26 pointed towards the inlet of the housing.

The hemispherical shape of the body of desiccant performs an important function in that it assists in producing a pattern or path of fluid flow therethrough (illustrated by arrows 10) wherein a greater amount of the desiccant is contacted by the fluid than if the desiccant body were a flat disk of uniform thickness. Where the desiccant body is a flat disk, then most of the fluid flow is through its center part or along the longitudinally axis of the disk with the result that relatively little fluid travels through the outside or peripheral parts thereof. As a consequence that part of the desiccant along the longitudinal axis of the flat disk quickly becomes saturated with moisture while the outside or peripheral parts remove little moisture from the fluid traversing the combination. Consequently, more time is required to dry the fluid down below dangerous levels at which freezing occurs. Where, however, the desiccant body has the hemispherical shape of my invention, the center part is thicker than the outside or peripheral parts so that there is an increased resistance to fluid flow through the center part than the outside part which is thinner. Because the center part of the hemispherical shaped desiccant body is thicker than the outside or peripheral parts, it diverts and directs a substantial part of the fluid flow to and through the outside parts, thereby effecting a good dispersement of fluid flow through the desiccant body and utilizing a maximum amount thereof. Accordingly, use of the hemispherical shaped desiccant body not only produces a more efficient moisture extraction, but a materially shortened drying time for the refrigeration system.

The hemispherical shape of the filter layer performs an important role in my combination in that it increases capacity to filter out a large amount of foreign particles. When the fluid has a high foreign particle content and is very dirty, the foreign particles tend to collect or lay up on the nose of the filter or on the nose of the hemispherical screen, thereby producing increased resistance to flow of fluid through the center part of the filter. Accordingly, most of the fluid flow is then diverted to the outside of the hemispherical screen and a majority of the filtered particles collect in the well 21 and in and upon the second portion 20 of the cylindrical part 17 between the inlet side of the band spring and the outlet side of the frame. This disposition of the majority of the filtered particles is due to a wiping action of the fluid flow around the outside and the peripheral parts of the hemispherical screen and the filter layer to cause an accumulation of the foreign particles in the well and in and upon the second portion of the cylindrical part of the filter layer.

Thus, my combination has important advantages arising from the hemispherical screen, the hemispherical filter layer with its cylindrical part, and the hemispherical body of desiccant. These advantages include ability to materially reduce drying time of the fluid, to bring into operation and to utilize a maximum amount of the desiccant body, and to substantially increase capacity to filter out foreign particles.

While I have shown and described a present preferred embodiment of my invention, it is to be understood that it may be otherwise embodied within the scope of the following claims.

I claim:

1. A filter-drier combination for connection into lines conveying fluids comprising a housing for flow of fluid therethrough, said housing having an inlet for flow of fluid thereinto and an outlet for flow of fluid therefrom, a substantially hemispherically shaped screen having a nose and a radially disposed substantially flat peripheral portion, said screen being disposed substantially transversely of the longitudinal axis of said housing and transversely of fluid flow therethrough, extending from the longitudinal axis radially to and being in engagement with an inside wall of said housing, and being positioned with said nose rearwardly of said inlet and pointed toward that part of said housing having said inlet, a filter layer of fibers disposed substantially transversely of the longitudinal axis of said housing and substantially transverely of said flow of fluid therethrough and extending from said longitudinal axis radially to and into engagement with an inside wall of said housing, said filter layer being on the outlet side of said screen, including a portion adapted to be substantially hemispherically shaped to substantially conform to said screen and including a cylindrical portion which forms a peripheral part of said filter member and which runs along a part of said inside wall of said housing, spring means in engagement with said cylindrical portion to urge and maintain said portion in contact with and completely around the inside wall of said housing, said spring means acting radially upon said cylindrical portion, a well on the outlet side of said screen for collection of filtered foreign particles, said well being formed by said radially disposed substantially flat peripheral portion, by a part of said inside wall of said housing and by a portion of said filter layer extending between the peripheral part of said hemispherical portion and said cylindrical portion, said well being interposed between said screen and said spring means, a substantially flat member pervious to passage of fluid therethrough disposed on the outlet side of said filter layer and transversely of said longitudinal axis of said housing, said flat member extending to and being in engagement with the inside wall of said housing, said filter layer and said flat member forming a chamber, a desiccant material in said chamber.

2. The combination of claim 1 characterized by said filter layer abutting and engaging the outlet side of said screen and having a substantially hemispherical shape with a nose in line with said nose of said screen and by said chamber formed by said filter layer and said flat member being substantially hemispherically shaped and by said desiccant material filling said chamber and having a substantially hemispherical shape with its nose in line with said nose of said screen.

3. A filter for connection into lines conveying fluids comprising a housing for flow of fluid therethrough, said housing having an inlet for flow of fluid therein and an outlet for flow of fluid therefrom, a substantially hemispherically shaped screen having a nose and a radially disposed substantially flat peripheral portion, said screen being disposed substantially transversely of the longitudinal axis of said housing and transversely of fluid flow therethrough, extending from the longitudinal axis radially to and being in engagement with an inside wall of said housing, and being positioned with said nose rearwardly of said inlet and pointed substantially toward that part of said housing having said inlet, a filter layer of fibers disposed substantially transversely of the longitudinal axis of said housing and substantially transversely of said flow of fluid therethrough and extending from said longitudinal axis radially to and into engagement with an inside wall of said housing, said filter layer being on the outlet side of said screen, including a portion adapted to be substantially hemispherically shaped to substantially conform to said screen and including a cylindrical portion which forms a peripheral part of said filter layer and which runs along a part of said inside wall of said housing, spring means in engagement with said cylindrical portion to urge and maintain said portion in contact with and completely around the inside wall of said housing, said spring means acting radially upon said cylindrical portion, a well on the outlet side of said screen for collection of filtered foreign particles, said well being formed by said radially disposed substantially flat peripheral portion, by a part of said inside wall of said housing and by a portion of said filter layer extending between the peripheral part of said hemispherical portion and said cylindrical portion, said well being interposed between said screen and said spring means.

4. The filter of claim 3 characterized by said filter layer abutting and engaging the outlet side of said screen and having a substantially hemispherical shape with a nose in line with said nose of said screen.

References Cited in the file of this patent

UNITED STATES PATENTS

| | | |
|---|---|---|
| 863,813 | Tyler | Aug. 20, 1907 |
| 2,065,658 | Compton | Dec. 29, 1936 |
| 2,098,102 | McLean | Nov. 2, 1937 |
| 2,325,657 | Burkness | Aug. 3, 1943 |